(12) United States Patent
Rahardjo et al.

(10) Patent No.: US 11,100,228 B2
(45) Date of Patent: Aug. 24, 2021

(54) SYSTEM AND METHOD TO RECOVER FPGA FIRMWARE OVER A SIDEBAND INTERFACE

(71) Applicant: Dell Products, L.P., Round Rock, TX (US)

(72) Inventors: Johan Rahardjo, Austin, TX (US); Pavan Kumar Gavvala, Anantapur (IN)

(73) Assignee: Dell Products, L.P., Round Rock, TX (US)

( * ) Notice: Subject to any disclaimer, the term of this patent is extended or adjusted under 35 U.S.C. 154(b) by 160 days.

(21) Appl. No.: 16/171,168

(22) Filed: Oct. 25, 2018

(65) Prior Publication Data

US 2020/0134183 A1  Apr. 30, 2020

(51) Int. Cl.
  *G06F 21/57*  (2013.01)
  *G06F 8/65*  (2018.01)
  (Continued)

(52) U.S. Cl.
  CPC ............ *G06F 21/572* (2013.01); *G06F 8/65* (2013.01); *G06F 9/445* (2013.01); *G06F 21/575* (2013.01);
  (Continued)

(58) Field of Classification Search
  CPC ... H04L 63/0428; H04L 9/0877; H04L 63/06; H04L 9/3247; G06F 3/0679;
  (Continued)

(56) References Cited

U.S. PATENT DOCUMENTS 6,918,027 B2 * 7/2005 Mantey ............... G06F 15/7867
  712/37
8,161,227 B1 * 4/2012 Diggs .................. G06F 3/0626
  365/185.14

(Continued)

FOREIGN PATENT DOCUMENTS

KR  10-2006-0065078 A  6/2006

OTHER PUBLICATIONS

International Search Authority (ISA), "International Search Report," International Application No. PCT/US2019/046466, Aug. 14, 2019, 2 pages, publisher Commissioner for Patents—PCT, Alexandria, Virginia, United States of America.

(Continued)

*Primary Examiner* — Faisal M Zaman
(74) *Attorney, Agent, or Firm* — Fogarty LLP

(57) ABSTRACT

Embodiments are described for recovery, via a sideband management bus, of firmware of a device such as an FPGA (Field Programmable Gate Array) card installed within an IHS (Information Handling System). A remote access controller of the IHS generates a security key for the device and transmits it to the device. The remote access controller requests the device to report the current version of the firmware in use by the device. The response from the device is authenticated based on the security key. If the current firmware version reported by the device is consistent with the master firmware version, the device is halted and the current firmware of the device is replaced with the master firmware. The device is initialized based on the master firmware used to update the device firmware.

14 Claims, 3 Drawing Sheets

(51) Int. Cl.
  *G06F 9/445*  (2018.01)
  *G06F 21/76*  (2013.01)
  *H04L 9/08*  (2006.01)

(52) U.S. Cl.
  CPC ............ *G06F 21/76* (2013.01); *H04L 9/0819* (2013.01); *H04L 9/0861* (2013.01)

(58) Field of Classification Search
  CPC .... G06F 11/3672; G06F 21/76; G06F 21/572; G06F 9/4401
  USPC .............................. 714/746; 713/1, 184, 194
  See application file for complete search history.

(56) References Cited

U.S. PATENT DOCUMENTS

| | | | | |
|---|---|---|---|---|
| 9,830,456 | B2* | 11/2017 | Grieco | G06F 21/572 |
| 9,930,051 | B1* | 3/2018 | Potlapally | H04L 63/126 |
| 10,031,993 | B1* | 7/2018 | Poornachandran | G06F 12/0246 |
| 2005/0091496 | A1* | 4/2005 | Hyser | H04L 9/3247 713/175 |
| 2010/0241838 | A1* | 9/2010 | Cohen | G06F 11/1433 713/2 |
| 2012/0179880 | A1* | 7/2012 | Ware | G06F 13/1663 711/148 |
| 2013/0174238 | A1* | 7/2013 | Wang | H04N 21/4367 726/7 |
| 2013/0185525 | A1* | 7/2013 | Lee | G06F 13/1621 711/151 |
| 2014/0129834 | A1* | 5/2014 | Brill | H04L 9/3226 713/168 |
| 2014/0130151 | A1* | 5/2014 | Krishnamurthy | G06F 8/65 726/22 |
| 2014/0331021 | A1* | 11/2014 | Kim | G06F 13/161 711/167 |
| 2016/0234686 | A1* | 8/2016 | Bone | H04L 63/062 |
| 2018/0060607 | A1* | 3/2018 | Tasher | G06F 21/602 |
| 2018/0165082 | A1* | 6/2018 | Batchelor | G06F 8/65 |
| 2018/0316425 | A1* | 11/2018 | Katiyar | G06F 8/654 |
| 2018/0329862 | A1* | 11/2018 | Cao | G06F 9/4401 |
| 2018/0364935 | A1* | 12/2018 | Sundrani | G06F 3/0604 |
| 2018/0365423 | A1* | 12/2018 | Poppe | G06F 21/105 |
| 2019/0042752 | A1* | 2/2019 | Mihm | G06F 21/572 |
| 2019/0079881 | A1* | 3/2019 | Nakazono | G06F 13/1663 |
| 2019/0087581 | A1* | 3/2019 | Kim | G06F 8/71 |
| 2019/0116690 | A1* | 4/2019 | Chen | G06F 11/2289 |
| 2020/0059780 | A1* | 2/2020 | Hess | H04L 9/3247 |

OTHER PUBLICATIONS

International Search Authority (ISA), "Written Opinion of the International Searching Authority," International Application No. PCT/US2019/046466, Aug. 14, 2019, 5 pages, publisher Commissioner for Patents—PCT, Alexandria, Virginia, United States of America.

* cited by examiner

SYSTEM AND METHOD TO RECOVER FPGA FIRMWARE OVER A SIDEBAND INTERFACE

FIELD

The present disclosure generally relates to Information Handling Systems (IHSs), and, more particularly, to management of components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, the most common technique for customizing the operations of an IHS has been through software programs that are executed by the IHS. More recently, FPGA (Field Programmable Gate Array) cards are used to provide customized IHS functionality at hardware speeds, while doing so at an affordable price. FPGA cards operate based on firmware instructions. Corruption of the firmware used by an FPGA card can result in the operations of the FPGA card being compromised.

SUMMARY

In various embodiments, a method is provided for recovery of firmware of a device installed within an IHS (Information Handling System), wherein the firmware recovery is via a sideband management bus. The method includes: generating a security key for the device; transmitting the security key to the device; requesting the device to report a version of firmware in use by the device; authenticating a firmware version response from the device based on the security key; determining if a master firmware version is consistent with the firmware version reported by the device; and if the reported firmware version is inconsistent with the master firmware version: halting the operation of the device; replacing the firmware of the device with the master firmware; and initializing the device using the updated firmware.

In additional method embodiments, the device digitally signs the firmware version response using the security key. In additional method embodiments, the firmware version response is authenticated based on the digital signature provided by the device. In additional method embodiments, the request for the device to report the firmware version is generated upon each power cycle of the device. In additional method embodiments, the consistency of the reported firmware with the master firmware is determined by comparing a version specified by a firmware header included in the firmware version response against a version specified by a header of the master firmware. In additional method embodiments, the device maintains firmware in an active partition and in a recovery partition. In additional method embodiments, the device is an FPGA card.

In various additional embodiments, a system recovers of firmware of device within an IHS (Information Handling System). The system includes: a remote access controller coupled to the device via a sideband management bus, the remote access controller configured to: generate a security key for the device; transmit the security key to the device; request the device to report a version of firmware in use by the device; authenticate a response from the device based on the security key; determine if a master firmware version is consistent with the active firmware version reported by the device; and if the reported active firmware version is inconsistent with the master firmware version: halt the device; replace the active firmware of the device with the master firmware; and the device configured to operate based on firmware stored in an active firmware partition, wherein the device is further configured to: transmit the response reporting the version of the firmware in the active firmware partition; receive master firmware for replacing the firmware in the active partition; and initialize operations based on the updated active firmware partition.

In additional system embodiments, the device digitally signs the response using the security key. In additional system embodiments, the response is authenticated by the remote access controller based on the digital signature provided by the device. In additional system embodiments, the request for the device to report the firmware version is generated upon each power cycle of the device. In additional system embodiments, the consistency of the reported firmware with the master firmware is determined by comparing a version specified by a firmware header included in the firmware version response against a version specified by a header of the master firmware. In additional system embodiments, the device is an FPGA card.

In various additional embodiments, a remote access controller is provided recovery of firmware of a device via a sideband management bus of an IHS (Information Handling System). The remote access controller includes: one or more processors; and a memory device coupled to the one or more processors, the memory device storing computer-readable instructions that, upon execution by the one or more processors, cause the remote access controller to: generate a security key for the device; transmit the security key to the device; request the device to report a current firmware version; authenticate a response from the device based on the security key; determine if a firmware version is consistent with the active firmware version reported by the device; and if the reported active firmware version is inconsistent with the master firmware version: halt the device; replace the active firmware of the device with the master firmware; and initialize the device using the updated firmware.

In additional remote access controller embodiments, the device digitally signs the response using the security key. In additional remote access controller embodiments, the response is authenticated based on the digital signature provided by the device. In additional remote access controller embodiments, the request for the device to report a current firmware version is generated upon each power cycle of the device. In additional remote access controller embodiments, the consistency of the reported firmware with the master firmware is determined by comparing a version specified by a firmware header included in the firmware version response against a version specified by a header of the master firmware. In additional remote access controller embodiments, the device is an FPGA card. In additional remote access controller embodiments, the device maintains firmware in an active partition and in a recovery partition.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
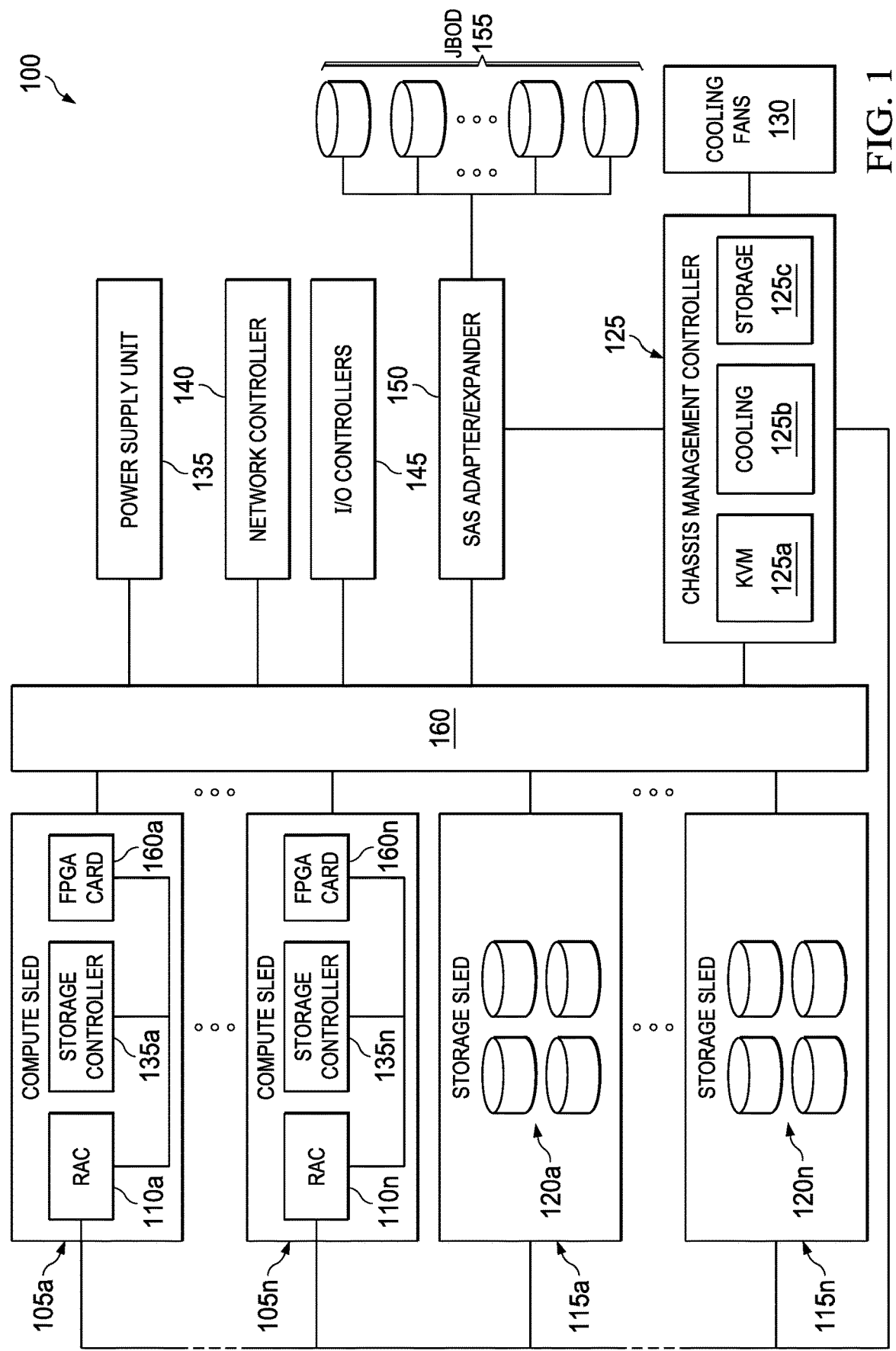
FIG. 1 is a diagram illustrating certain components of a chassis, according to some embodiments, for recovery of FPGA card firmware via a sideband management bus.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
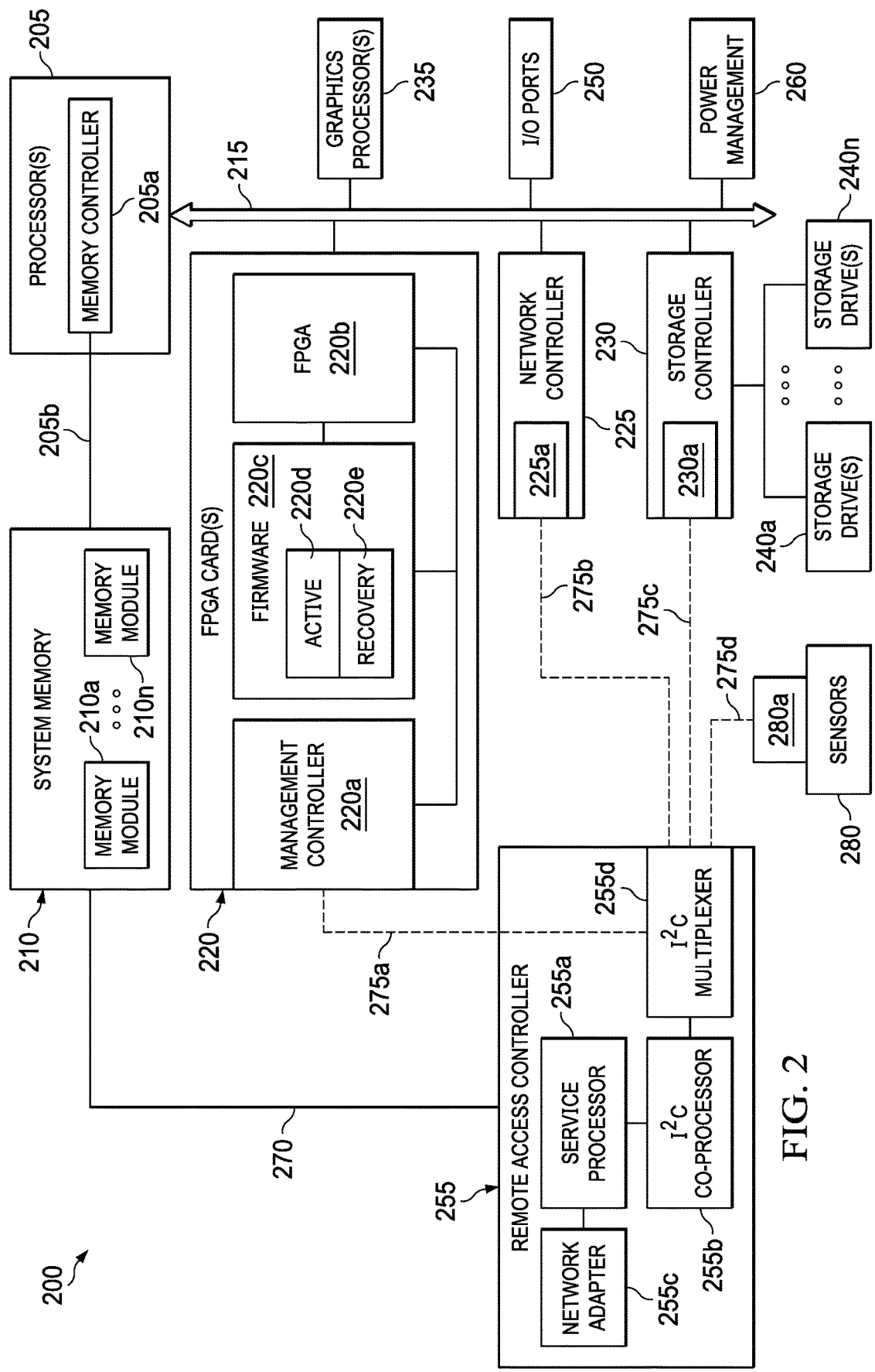
FIG. 2 is a diagram illustrating certain components of an IHS configured as a component of chassis, according to some embodiments, for recovery of FPGA card firmware via a sideband management bus.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

As illustrated, each of the compute sleds 105a-n also includes an FPGA card 160a-n that may be configured to customize the operations of compute sled 105a-n. As described in additional detail with regard to FIGS. 2 and 3, FPGA cards 160a-n may operate using firmware instructions that may be corrupted, thus rending an FPG card inoperable and potentially exposing the compute sleds 105a-n and the entire chassis 100 to security vulnerabilities. In various embodiments, remote access controllers 110a-n may be configured to monitor the firmware in use by an FPGA card and, in response to detecting a discrepancy in the firmware in use by the FPGA, replacing the firmware of an FPGA card with a master copy held by the remote access controller.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

As illustrated, an FPGA card 220 may include an FPGA integrated circuit 220b that may be reprogrammed in order to modify the internal circuitry of the FPGA 220b, thus modifying the operations performed by the FPGA card 220. In certain embodiments, the operations of the FPGA circuit 220b may be based on firmware 220c instructions stored in a non-volatile memory of the FPGA card 220. The firmware 220c may implement various aspects of the operation of the FPGA circuit 220b, such as initialization procedures, implementing security protocols and configuring input and output capabilities. In some scenarios, the firmware 220c may include bitstreams used in configuring the internal structure of the FPGA circuitry 220b. Accordingly, corruption of the firmware 220c may result in operations of the FPGA 220b being compromised. In certain instances, the corruption of the firmware 220c may render the FPGA 220b inoperable.

As illustrated, the firmware 220c of the FPGA 220b may be stored within an active partition 220d and a recovery partition 220e. The FPGA 220b may be configured to operate using the firmware instructions stored in the active partition 220d. In certain instances, the recovery partition 220e may include an identical version of the firmware instructions stored in the active partition 220d. However, in many instances, the recovery partition 220e may only be used to store prior versions of the firmware instructions in order to support rollback capabilities. In many instances, the storage space afforded to the recovery partition 220e may not accommodate both a backup copy of the active partition 220d and a prior version of the firmware to which to revert in support of a rollback operation.

In conventional scenarios, an FPGA may be configured to replace corrupted firmware in an active partition with the firmware stored in a recovery partition. In such scenarios, the firmware stored in the recovery partition may be used to reinitialize the FPGA, but only after FPGA has been reconfigured as a bus endpoint, now configured using the recovery partition firmware. This process of reconfiguring the FPGA on the device management bus results in a delay and may can trigger bus deadlocks that can have cascading effects. As described, in many scenarios, firmware stored in the recovery partition may not be identical to the firmware in an active partition. In such cases, the recovery partition firmware may expose the FPGA to security vulnerabilities that were addressed by the newer version of the firmware in the active partition. In such scenarios, reverting to use of the recovery partition firmware may result in the operations of the FPGA being subject to misuse by a malicious actor. As described in additional detail with regard to the below embodiments, the remote access controller 255 may be configured to detect corruption of the active firmware 220d of the FPGA 220b and to replace the corrupted firmware without reliance on the recovery firmware partition 220e of the FPGA card.

As illustrated, the FPGA card 220 may also include a management controller 220a that may support interoperation with the remote access controller 255 via a sideband device management bus 275a. As described in additional detail with regard to the below embodiments, the management controller 220a may be configured to interoperate with the remote access controller 255 in detecting the use of corrupted firmware by the FPGA card 220 and in replacing the corrupted firmware with a master copy of the FPGA card firmware maintained by the remote access controller 255. In certain embodiments, the management controller 220*a* may be configured to detect any changes to the firmware 220*d-e* of the FPGA card.

Upon detecting such changes, the management controller 220*a* may transmit a copy the firmware 220*d-e* to the remote access controller 255 for use in maintaining a master copy of the firmware. In certain embodiments, the remote access controller 255 may be configured to verity the authenticity of the received firmware before accepting it as the master copy. In certain embodiment, the remote access controller 255 may authenticate firmware based on checksum calculations. In certain embodiments, the remote access controller 255 may authenticate received firmware via a remote service that can verify the integrity and source of firmware.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275*a-d* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or microcontroller that is configured to interface via a sideband I2C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-d* is illustrated as single line in FIG. 2. However, each I2C bus 275*a-d* may be comprised of a clock line and data line that couple the remote access controller 255 to I2C endpoints 220*a*, 225*a*, 230*a*, 280*a* which may be designated as modular field replaceable units (FRUs).

As illustrated, the I2C co-processor 255*b* may interface with the individual managed devices 220, 225, 230, 280 via individual sideband I2C buses 275*a-d* selected through the operation of an I2C multiplexer 255*d*. Via switching operations by the I2C multiplexer 255*d*, a sideband bus connection 275*a-d* may be established by a direct coupling between the I2C co-processor 255*b* and an individual managed device 220, 225, 230, 280.

In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280. In certain embodiments, the endpoint I2C controller 280*a* of the FPGA card 220 may correspond to the management controller 220*a* described above.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
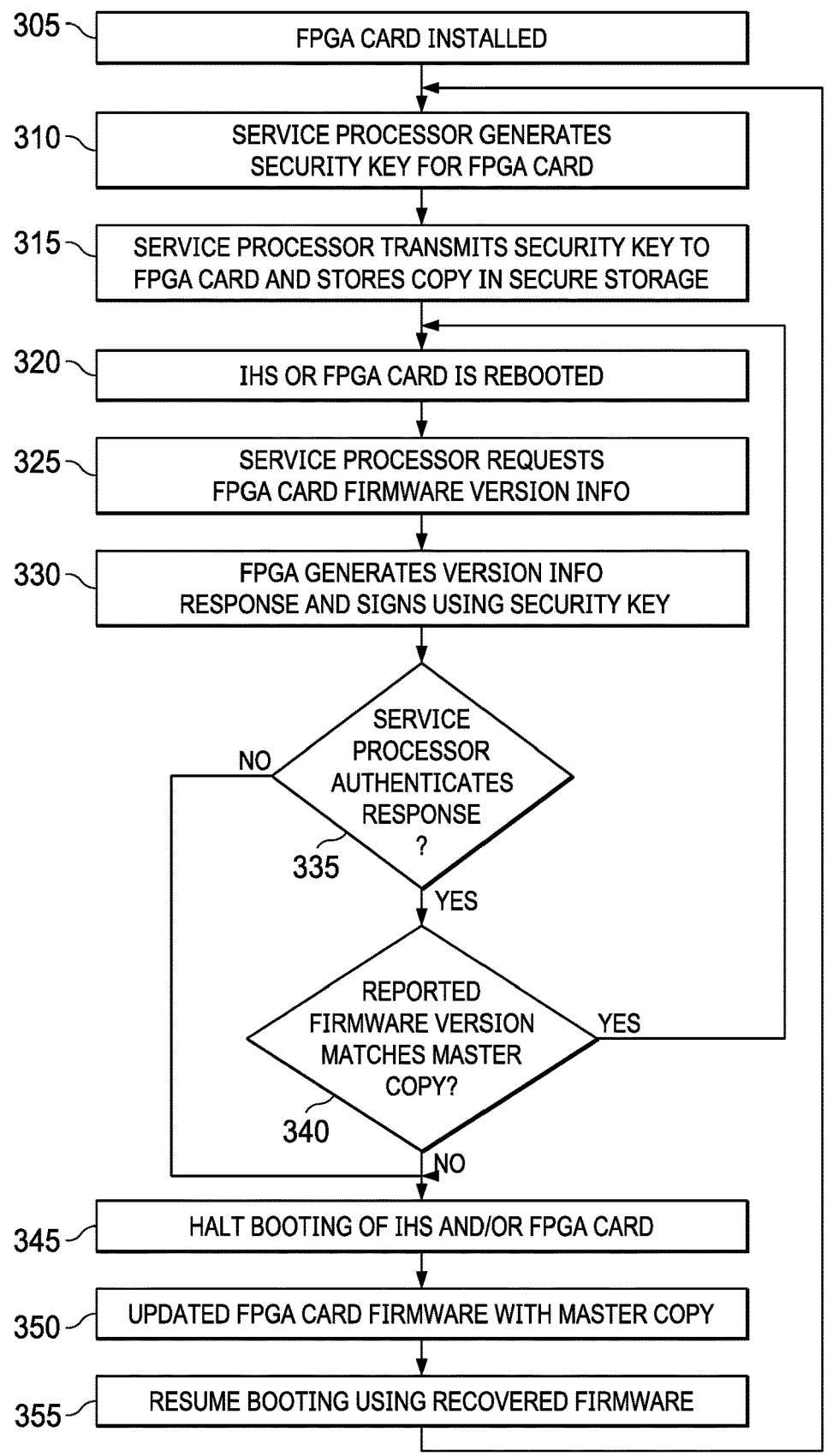
FIG. 3 is a flowchart describing certain steps of a method, according to some embodiments, for recovery of FPGA card firmware via a sideband management bus.

FIG. 3 is a flowchart describing certain steps of a method, according to some embodiments, for recovery of FPGA card firmware via a sideband management bus. As described with regard to FIG. 2, an FPGA card may be installed as a component of an IHS that is managed by a remote access controller via a sideband management bus. The illustrated embodiment begins at block 305 with the installation of an FPGA card as a component of the IHS such that the FPGA card is coupled via a sideband management bus to a remote access controller of the IHS.

Upon detecting the installed FPGA card, at block 310, the service processor of the remote access controller generates a unique security key for the detected FPGA card. At block 315, the security key is stored in a secured storage of the remote access controller, and a copy is transmitted to the FPGA card, where it may be maintained in a secure storage of the FPGA card management controller. In addition to this initialization process, the FPGA card may commence operations according to the firmware instructions stored within an active firmware partition, such as described above. In certain embodiments, upon the initial booting of the FPGA card, a copy of the current active and/or recovery partition firmware may be provided to the remote access controller, where the firmware may be stored as a master copy for use in replacement of corrupted FPGA card firmware. The FPGA card management controller may similarly provide a copy of the FPGA firmware, active and/or recovery, to the remote management controller upon detecting any modification to the firmware of the FPGA card. The FPGA card may commence operations until, at block 320, the FPGA card and/or the IHS in which the FPGA card is installed are rebooted.

During initialization of the IHS and/or the FPGA card, the service processor of the remote access controller may issue a request, at block 325, to the FPGA card via the sideband management bus for FPGA card to report the current version of the active partition firmware in use by the FPGA. As described with regard to FIG. 2, the remote access controller may be configured to control various BIOS functions, such as booting the operating system of the IHS and initializing various components of the IHS. Accordingly, in certain embodiments, the remote access controller may be configured to pause the initialization of the FPGA card and/or the IHS until the process of FIG. 3 for recovery of corrupted FPGA card firmware has been completed.

While initialization remains paused, the request for firmware version information is received by the FPGA card, and at block 330, the FPGA card generates a response that specifies the version of the firmware currently stored in the active firmware partition. In certain embodiments, the response to the firmware identification request may include a copy of the firmware, or of a portion of the firmware, that includes a header that specifies a version of the firmware. In certain embodiments, the FPGA card management controller may include in the firmware version response one or more hash values calculated based on the firmware instructions of the active and/or recovery partitions. In certain embodiments, the FPGA card may utilize the security key received from the remote access controller at block 315 to digitally sign the firmware version response. The signed response may then be transmitted to the remote access controller by the FPGA card management controller via the sideband management bus.

At block 335, the service processor authenticates the response from the FPGA card. In certain embodiments, the service processor may authenticate the response by determining whether it has been digitally signed using the security key generated for the FPGA card at block 310. If the response from the FPGA card cannot be authenticated by the service processor, at block 345, the initialization of the FPGA card may be halted since the active firmware of the FPGA card is presumably corrupted. In certain scenarios, the initialization of the IHS may be allowed to resume without initialization of the FPGA card.

If the response from the FPGA card is properly authenticated, at block 340, the service processor determines whether the firmware reported by the FPGA card matches the master copy of the firmware stored by the remote access controller. In embodiments where the response includes a firmware header, the version specified in the provided header is compared against firmware header information maintained in the master copy by the remote access controller. In certain embodiments, the integrity of the FPGA firmware may be determined based on comparison of hash values provided in the response against hash values calculated by the remote access controller based on the master copy of the firmware. If the firmware reported by the FPGA card matches the master copy of the firmware, initialization of the FPGA card and/or IHS resumes and the FPGA card operates using the firmware in the active partition.

If, at block 340, the service processor detects a difference between the master copy of the firmware and the firmware reported by the FPGA card, at block 345, the service processor suspends initialization of the FPGA card and/or the IHS. In such scenarios, the firmware is presumably corrupted. Accordingly, at block 350, the service processor replaces the firmware stored in the active and recovery partitions of the FPGA card with the master copy version of the firmware stored by the remote access controller. Upon replacing the firmware, the booting of the FPGA card and/or IHS resumes using the master version of the firmware that is now stored in the active firmware partition of the FPGA card. As illustrated, upon booting, the process returns to block 310 where the service processor generates a new security key for the FPGA card, which is distributed to the FPGA card and used to digitally sign future firmware version responses.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for recovery of firmware of a device installed within an IHS (Information Handling System), the method comprising:
generating a security key for the device installed within the IHS, wherein the security key is generated by a remote access controller also installed within the IHS and that provides remote management of the device, and wherein the remote access controller is coupled to the device via a sideband management bus that provides a signaling pathway within the IHS between the remote access controller and the device, and wherein the device is coupled to a processor of the IHS via an in-line bus, and wherein the remote access controller of the IHS stores a master copy of firmware of the device; and wherein the device comprises an FPGA (Field Programmable Gate Array) coupled to the remote access controller via the sideband management bus that provides a signaling pathway within the IHS between the FPGA and the remote access controller, and wherein the FPGA comprises a management controller that couples the FPGA to the remote access controller within the IHS via the sideband management bus;
transmitting, by the remote access controller, the security key to the device via the sideband management bus that provides a signaling pathway within the IHS between the remote access controller and the device;
requesting, by the remote access controller via the sideband management bus that provides a signaling pathway within the IHS to the device, the device to report a version of firmware in use by the device, wherein the management controller of the FPGA reports the firmware version response to the remote access controller via the sideband management bus;
authenticating, by the remote access controller, a firmware version response from the device based on the security key stored in a secure memory of the remote access controller;
determining, by the remote access controller, when a master firmware version is consistent with the firmware version reported by the device; and
when the reported firmware version is inconsistent with the master firmware version:
halting the operation of the device;
replacing the firmware of the device with the master firmware stored by the remote access controller, wherein the master firmware is transmitted to the device via the sideband management bus the provides a signaling pathway within the IHS between the remote access controller and the device; and
initializing the device using the master firmware.

2. The method of claim 1, wherein the request for the device to report the firmware version is generated by the remote access controller upon each power cycle of the device.

3. The method of claim 1, wherein the consistency of the reported firmware with the master firmware is determined by comparing a version specified by a firmware header included in the firmware version response against a version specified by a header of the master firmware stored by the remote access controller.

4. The method of claim 1, wherein the FPGA maintains firmware in an active partition and in a recovery partition, and wherein the remote access controller replaces firmware in the active partition and the recovery partition of the FPGA with the master firmware stored by the remote access controller.

5. The method of claim 4, wherein the master firmware stored by the remote access controller replaces the firmware in the active and recovery partitions without the recovery partition of the FPGA being utilized to operate the FPGA.

6. A system for recovery of firmware of device within an IHS (Information Handling System), the system comprising:
a remote access controller installed within the IHS coupled to the device via a sideband management bus that provides a signaling pathway within the IHS between the remote access controller and the device, wherein the device is coupled to a processor of the IHS via an in-line bus, and wherein the remote access controller provides remote management of the device, and wherein the remote access controller stores a master copy of firmware of the device, and wherein the device comprises an FPGA (Field Programmable Gate Array) coupled to the remote access controller via the sideband management bus that provides a signaling pathway within the IHS between the FPGA and the remote access controller, and wherein the FPGA comprises a management controller that couples the FPGA to the remote access controller within the IHS via the sideband management bus, the remote access controller configured to:
generate a security key for the device installed within the IHS, wherein the generated security key is stored in a secure memory of the remote access controller installed within the IHS;
transmit, via the sideband management bus that provides a signaling pathway within the IHS between the remote access controller and the device, the security key to the device;
request, via the sideband management bus that provides a signaling pathway within the IHS between the remote access controller and the device, the device to report a version of firmware in use by the device, wherein the management controller of the FPGA reports the firmware version response to the remote access controller via the sideband management bus;
authenticate a response from the device based on the security key stored in the secure memory of the remote access controller;
determine if the master copy of the firmware stored by the remote access controller is consistent with the active firmware version reported by the device; and
if the reported active firmware version is inconsistent with the master firmware version:
halt the device; and
replace the active firmware of the device with the master firmware; and
the device configured to operate based on firmware stored in an active firmware partition, wherein the device is further configured to:

transmit, via the sideband management bus between the remote access controller and the device, the response reporting the version of the firmware in the active firmware partition;

receive, via the sideband management bus that provides a signaling pathway within the IHS between the remote access controller and the device, master firmware for replacing the firmware in the active partition; and initialize operations based on the updated active firmware partition.

7. The system of claim 6, wherein the request for the device to report the firmware version is generated by the remote access controller upon each power cycle of the device.

8. The system of claim 6, wherein the consistency of the reported firmware with the master firmware is determined by comparing a version specified by a firmware header included in the firmware version response against a version specified by a header of the master firmware stored by the remote access controller.

9. The system of claim 6, wherein the firmware version reported by the device comprises a signature calculated based on firmware instructions of the device in the active firmware partition.

10. A remote access controller for recovery of firmware of a device and for remote management of the device, the remote access controller comprises:

a sideband management bus that that provides a signaling pathway within the IHS between the remote access controller and the device and wherein the device is coupled to a processor of the IHS via an in-line bus, wherein the device comprises an FPGA (Field Programmable Gate Array) coupled to the remote access controller via the sideband management bus that provides a signaling pathway within the IHS between the FPGA and the remote access controller, and wherein the FPGA comprises a management controller that couples the FPGA to the remote access controller within the IHS via the sideband management bus;

one or more processors; and a memory device coupled to the one or more processors, wherein the memory device stores a master copy of firmware of the device and a security key for the device, and wherein the memory device stores computer-readable instructions that, upon execution by the one or more processors, cause the remote access controller to:

generate the security key for the device;

transmit, via the sideband management bus that provides a signaling pathway within the IHS between the remote access controller and the device, the security key to the device;

request, via the sideband management bus that provides a signaling pathway within the IHS between the remote access controller and the device, the device to report a current firmware version, wherein the management controller of the FPGA reports the firmware version response to the remote access controller via the sideband management bus;

authenticate a response from the device based on the security key stored by the remote access controller;

determine if the master copy of the firmware stored by the remote access controller is consistent with the active firmware version reported by the device; and if the reported active firmware version is inconsistent with the master firmware version:

halt the device;

transmit the master firmware to the device via the sideband management bus the provides a signaling pathway within the IHS between the remote access controller and the device;

replace the active firmware of the device with the master firmware; and initialize the device using the updated firmware.

11. The remote access controller of claim 10, wherein the request for the device to report a current firmware version is generated by the remote access controller upon each power cycle of the device.

12. The remote access controller of claim 10, wherein the consistency of the reported firmware with the master firmware is determined by comparing a version specified by a firmware header included in the firmware version response against a version specified by a header of the master firmware stored by the remote access controller.

13. The remote access controller of claim 10, wherein firmware version reported by the device comprises a signature calculated based on firmware instructions of the device in the active firmware partition.

14. The remote access controller of claim 10, wherein the FPGA maintains firmware in an active partition and in a recovery partition, and wherein the remote access controller replaces firmware in the active partition and the recovery partition of the FPGA with the master firmware stored by the remote access controller.

* * * * *